US012574537B2

(12) United States Patent
Zhang et al.

(10) Patent No.: US 12,574,537 B2
(45) Date of Patent: Mar. 10, 2026

(54) VIDEO PROCESSING METHODS, DEVICES, ELECTRONIC DEVICES AND COMPUTER-READABLE STORAGE MEDIA

(71) Applicant: University of Chinese Academy of Sciences, Beijing (CN)

(72) Inventors: Xinfeng Zhang, Beijing (CN); Lv Tang, Beijing (CN)

(73) Assignee: University of Chinese Academy of Sciences, Beijing (CN)

( * ) Notice: Subject to any disclaimer, the term of this patent is extended or adjusted under 35 U.S.C. 154(b) by 361 days.

(21) Appl. No.: 18/360,868

(22) Filed: Jul. 28, 2023

(65) Prior Publication Data

US 2024/0348817 A1    Oct. 17, 2024

(30) Foreign Application Priority Data

Apr. 17, 2023    (CN) .......................... 202310410441.8

(51) Int. Cl.
| | |
|---|---|
| *H04N 19/503* | (2014.01) |
| *H04N 19/107* | (2014.01) |
| *H04N 19/119* | (2014.01) |
| *H04N 19/136* | (2014.01) |
| *H04N 19/154* | (2014.01) |
| *H04N 19/172* | (2014.01) |
| *H04N 19/593* | (2014.01) |

(52) U.S. Cl.
CPC ......... *H04N 19/503* (2014.11); *H04N 19/107* (2014.11); *H04N 19/119* (2014.11); *H04N 19/136* (2014.11); *H04N 19/154* (2014.11); *H04N 19/172* (2014.11); *H04N 19/593* (2014.11)

(58) Field of Classification Search
CPC .................................................... H04N 19/503
See application file for complete search history.

(56) References Cited

U.S. PATENT DOCUMENTS

| | | | |
|---|---|---|---|
| 2022/0385907 A1* | 12/2022 | Zhang | H04N 19/172 |
| 2024/0236378 A1* | 7/2024 | Yu | H04N 19/134 |

* cited by examiner

*Primary Examiner* — Jerry T Jean Baptiste
(74) *Attorney, Agent, or Firm* — Bayramoglu Law Offices LLC

(57) ABSTRACT

A method, apparatus, electronic device, and computer-readable storage medium for video processing. The video processing method comprises encoding an original video sequence into network model parameters of an implicit neural network model, and iteratively optimizing the network model parameters based on the original video sequence until a predetermined requirement is met. The video processing improves rate-distortion performance, optimizes storage space and transmission bandwidth, overcomes the limitations of existing methods that can only utilize adjacent frames or limited frame information to remove inter-frame redundancy, breaks through the bottleneck of existing video compression algorithms, enhances video compression efficiency, and reduces bit rate.

14 Claims, 4 Drawing Sheets

Encoding the original video sequence into network model parameters of an implicit neural network model. ⟋⁓ S10

Iteratively optimizing the network model parameters based on the original video sequence until a predetermined requirement is met. ⟋⁓ S20

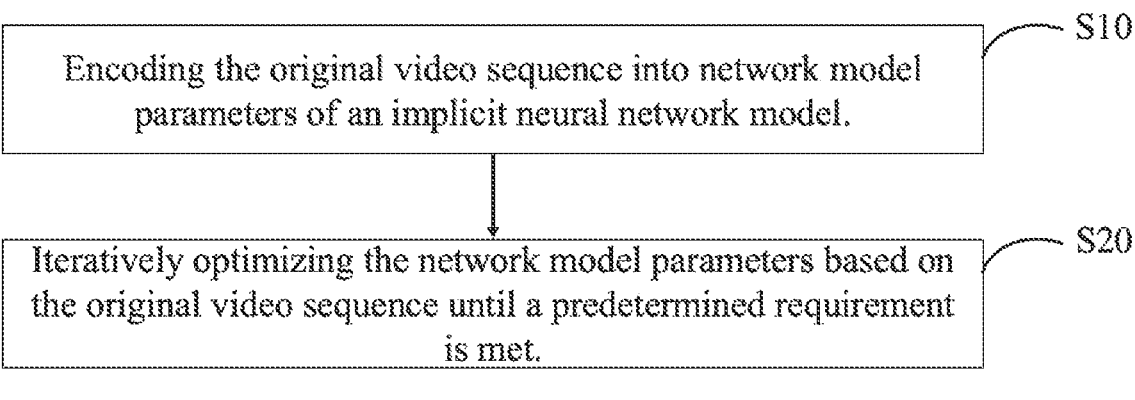

Encoding the original video sequence into network model parameters of an implicit neural network model. — S10

Iteratively optimizing the network model parameters based on the original video sequence until a predetermined requirement is met. — S20

FIG.1

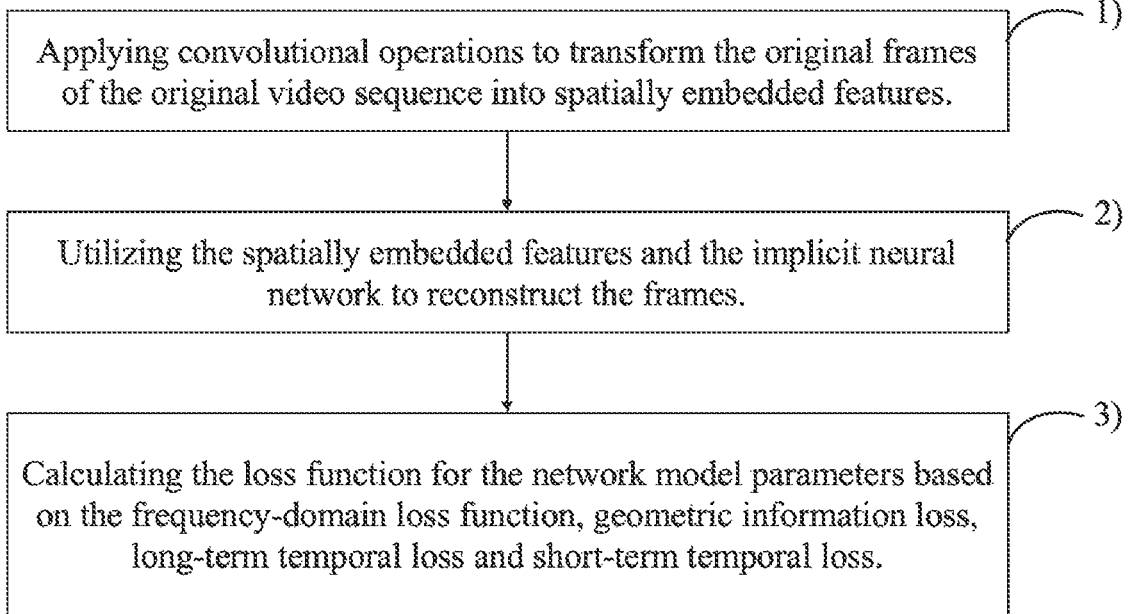

Applying convolutional operations to transform the original frames of the original video sequence into spatially embedded features. — 1)

Utilizing the spatially embedded features and the implicit neural network to reconstruct the frames. — 2)

Calculating the loss function for the network model parameters based on the frequency-domain loss function, geometric information loss, long-term temporal loss and short-term temporal loss. — 3)

FIG.2

VIDEO PROCESSING METHODS, DEVICES, ELECTRONIC DEVICES AND COMPUTER-READABLE STORAGE MEDIA

CROSS-REFERENCE TO THE RELATED APPLICATION

This application is based upon and claims priority to Chinese Patent Application No. 202310410441.8 filed on Apr. 17, 2023, the entire content of which is incorporated herein by reference.

TECHNICAL FIELD

This application relates to the field of video processing technology and specifically involves a video processing method, device, electronic device, and computer-readable storage medium.

BACKGROUND

In the digital era, video data is ubiquitous in our daily lives. Therefore, efficiently storing or transmitting video data is a crucial issue. Over the decades, traditional hybrid video coding frameworks such as H.264/AVC, H.265/HEVC, and H.266/VVC, as well as deep learning-based video coding methods, have been proposed to further improve the performance of video coding.

Both traditional hybrid video coding frameworks and deep learning-based video coding frameworks aim to remove spatial and temporal redundancies in video. Despite their carefully designed approaches, utilizing block-to-block or frame-to-frame methods to eliminate temporal redundancy, these existing methods have a limitation. They can only utilize adjacent frames or a limited number of frames to remove inter-frame redundancy, resulting in performance bottlenecks and the need for further improvement in video compression efficiency and bitrate reduction.

SUMMARY

The purpose of this application is to provide a video processing method, device, electronic equipment, and computer-readable storage medium to overcome the limitations of existing methods that can only utilize adjacent frames or a limited number of frames to remove inter-frame redundancy. It aims to break through the existing bottlenecks in video compression algorithms and improve video compression performance while reducing bitrate. In order to have a basic understanding of certain aspects of the disclosed embodiments, a brief summary is provided below. This summary is not intended to be a comprehensive overview or to define key/significant components or delimit the scope of these embodiments. Its sole purpose is to present certain concepts in a simplified form as a preamble to the detailed description that follows.

According to one aspect of the disclosed embodiments of this application, a video processing method is characterized by comprising the following steps:

Encoding the original video sequence into network model parameters of an implicit neural network model;

Iteratively optimizing the network model parameters based on the original video sequence until a predetermined requirement is met.

According to some embodiments of the present application, the iterative optimization of the network model parameters based on the original video sequence includes the following steps:

Obtaining the loss function of the network model parameters based on the original video sequence;

Iteratively optimizing the network model parameters based on the loss function obtained from the original video sequence.

According to some embodiments of the present application, obtaining the loss function of the network model parameters based on the original video sequence, which includes:

Transforming the individual frames of the original video sequence into spatially embedded features using convolutional operations;

Utilizing the spatially embedded features along with an implicit neural network to reconstruct the frames and obtain reconstructed frames;

Obtaining the frequency domain loss function, geometric information loss function, long-term temporal loss function, and short-term temporal loss function of the network model parameters based on the reconstructed frames and the original frames.

According to some embodiments of the present application, obtaining the frequency domain loss function of the network model parameters based on the reconstructed frames and the original frames, which includes:

During the supervision of the reconstructed frames, perform frequency domain transformation on both the reconstructed frames and the original frames using frequency domain transformation operations;

Using the difference between the frequency domain representations of the reconstructed frames and the original frames in the frequency domain space as the frequency domain loss function.

According to some embodiments of the present application, obtaining the geometric information loss function of the network model parameters based on the reconstructed frames and the original frames, which includes:

Predicting the depth information and normal vector information of the reconstructed frames by performing prediction on the corresponding features of the reconstructed frames. These predicted values serve as the estimated depth information and normal vector information for the reconstructed frames;

Predicting the depth information and normal vector information of the original frames, which serve as the ground truth values for the depth and normal vector information;

Calculating the difference between the predicted values and the ground truth values of the depth and normal vector information. This difference serves as the geometric information loss function.

According to some embodiments of the present application, obtaining the long-term temporal features of the network model parameters based on the reconstructed frames and the original frames, which includes:

Extracting the feature information from the current reconstructed frame and previous reconstructed frames. Utilizing an optimization mechanism based on Gaussian distribution prior to obtain the long-term temporal loss function.

According to some embodiments of the present application, obtaining the short-term temporal loss function of the network model parameters based on the reconstructed frames and the original frames, which includes:

For the features corresponding to the reconstructed frames, predicting the forward optical flow information and the backward optical flow information;

Calculating the ground truth forward optical flow and backward optical flow between two adjacent original frames;

Calculating the difference between the ground truth optical flow and the predicted optical flow as the short-term temporal loss function.

According to some embodiments of the present application, the method involves iteratively optimizing the network model parameters based on the original video sequence. It further includes the following steps:

Obtaining the rate-distortion of the network model parameters,

According to the rate-distortion, performing scene division on the original video sequence to obtain the segmented original video sequence;

Iteratively optimizing the network model parameters based on the segmented original video sequence until the preset requirements are met.

According to the rate-distortion, performing scene division on the original video sequence to obtain the segmented original video sequence;

Iteratively optimizing the network model parameters based on the segmented original video sequence until the preset requirements are met.

According to some embodiments of the present application, the method includes the following additional steps before encoding the original video sequence into the implicit neural network model parameters:

Based on the differences in scene transitions, performing scene division on the input video to obtain multiple original video sequences.

According to one aspect of the disclosed embodiments of this application, a video processing apparatus is provided, comprising:

An encoding module, for encoding the original video sequence into network model parameters of the implicit neural network model;

An optimization module, for iteratively optimizing the network model parameters based on the original video sequence until a predefined criterion is met.

According to one aspect of the disclosed embodiments of this application, an electronic device comprising a memory, a processor, and a computer program stored in the memory and executable on the processor. The processor executes the computer program to implement the video processing methods described in any embodiment of the present application.

According to one aspect of the disclosed embodiments of this application, a computer-readable storage medium is provided, storing a computer program that is executable by a processor to implement the video processing methods described in any embodiment of the present application.

The technological solution provided in one aspect of the disclosed embodiments of this application can offer the following beneficial effects:

The embodiments of the present application provide a video processing method that encodes the original video sequence into network model parameters of an implicit neural network. The method further involves iteratively optimizing the network model parameters based on the original video sequence until a predefined requirement is met. This approach improves rate-distortion performance, optimizes storage space and transmission bandwidth, overcomes the limitations of existing methods that can only utilize neighboring frames or limited frame information to remove inter-frame redundancy, and breaks through the bottlenecks of existing video compression algorithms, resulting in enhanced video compression efficiency and reduced bitrate.

The above description provides an overview of the technical solution in the embodiments of the present application. In order to have a clearer understanding of the specific technical means of the embodiments, the following specific embodiments are provided in accordance with the content of the specification. These embodiments are given to illustrate the embodiments of the present application and to make the above and other purposes, features, and advantages of the embodiments more apparent and understandable.

BRIEF DESCRIPTION OF THE DRAWINGS

In order to provide a clearer explanation of the technical solutions in the embodiments of the present application or the prior art, the accompanying drawings used in the embodiments or the description of the prior art will be briefly introduced below. It is evident that the accompanying drawings described below are merely some embodiments disclosed in the present application, and those skilled in the art can obtain other accompanying drawings based on these drawings without exercising inventive labor.

FIG. 1 illustrates the flowchart of a video processing method according to one or more embodiments.

FIG. 2 depicts the flowchart of obtaining the loss function for acquiring the network model parameters based on the original video sequence, according to one embodiment of the present application.

DETAILED DESCRIPTION OF THE EMBODIMENTS

Figure 3:
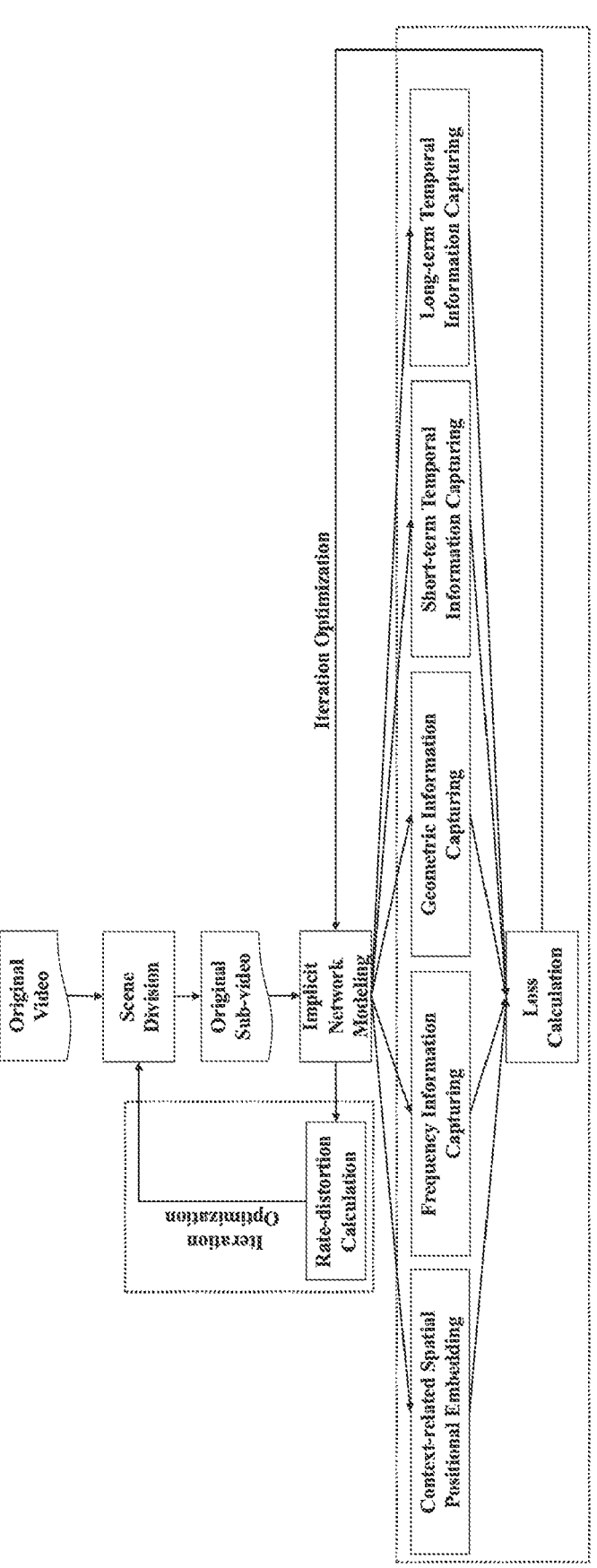
FIG. 3 illustrates the flowchart of the video processing method according to one or more embodiments of the present application.

In order to provide a clearer understanding of the objectives, technical solutions, and advantages of the present application, the following detailed description is provided in conjunction with the accompanying drawings and specific embodiments. It should be understood that the specific embodiments described herein are intended to illustrate the present application and are not intended to limit the scope of the present application. All other embodiments obtained by those skilled in the art without exercising inventive labor, based on the embodiments disclosed in the present application, are within the scope of protection of the present application.

It is understood by those skilled in the art that, unless otherwise defined, all terms used herein (including technical and scientific terms) have the same meaning as commonly understood by those skilled in the field of the present application. It should also be understood that terms such as those defined in general dictionaries should be interpreted to have the same meaning as in the context of the prior art, and should not be interpreted in an idealized or overly formal sense unless specifically defined as such here.

In light of the pressing need to improve video compression efficiency in the relevant technologies, the video processing method comprises the following steps: encoding an original video sequence into network model parameters of an implicit neural network model; iteratively optimizing the network model parameters based on the original video sequence until a predetermined requirement is met. The video processing method provided in the exemplary embodiments of this application improves rate-distortion performance, optimizes storage space and transmission bandwidth, overcomes the limitations of existing methods that can only utilize adjacent frames or limited frame information to remove inter-frame redundancy, breaks through the bottleneck of existing video compression algorithms, enhances video compression efficiency, and reduces bit rate.

Referring to the illustrated diagram in FIG. 1, one embodiment of the present application presents a video processing method that encompasses steps S10 to S20:

S10, Encoding the original video sequence into network model parameters of an implicit neural network model.

For the original video sequence, the first step involves modeling and representing it using an implicit neural network model. This process encodes the original video into parameters of the neural network.

In some embodiments, the original video sequence can be divided into multiple sub-video sequences through scene division. Each sub-video sequence is then modeled and represented using an implicit neural network model, resulting in the encoding of each sub-video sequence into parameters of the neural network.

In some embodiments, prior to encoding the original video sequence into parameters of the implicit neural network model in step S10, the video processing method may further include scene division of the input video based on differences in camera shot changes. This segmentation results in multiple original video sequences, which are then processed individually.

In order to effectively utilize the scene variations in the video sequence, an adaptive scene division mechanism is employed for scene division. This adaptive scene division mechanism includes the following steps: For a relatively long video sequence to be modeled, which may contain multiple camera shot changes indicating different scenes, the video is segmented based on these camera shot changes. For example, using a scene division library function like PySceneDetect, the original video sequence is divided into several sub-video sequences based on its camera shot changes and scene transitions.

S20, Iteratively optimizing the network model parameters based on the original video sequence until a predetermined requirement is met.

In some embodiments, the iteration optimization of the network model parameters based on the original video sequence can include the following steps: Obtaining the loss function for the network model parameters based on the original video sequence; Performing iterative optimization of the network model parameters based on the obtained loss function.

As illustrated in FIG. 2, an exemplary approach to obtaining the loss function for the network model parameters based on the original video sequence can include the following steps: 1) Applying convolutional operations to transform the original frames of the original video sequence into spatially embedded features; 2) Utilizing the spatially embedded features and the implicit neural network to reconstruct the frames, resulting in reconstructed frames; 3) Calculating the loss function for the network model parameters based on the frequency-domain loss function, geometric information loss, long-term temporal loss and short-term temporal loss.

In an exemplary manner, the frequency-domain loss function for obtaining the network model parameters based on the reconstructed frames and the original frames can involve the following steps: During the supervision of the reconstruction frame, a frequency domain transformation operation is applied to both the reconstruction frame and the original frame to convert them into the frequency domain space; The frequency domain loss function is computed by measuring the difference between the reconstructed frame and the original frame in the frequency domain.

In some embodiments, the geometric information loss function for obtaining the network model parameters based on the reconstructed frames and the original frames can include the following steps: predicting the depth and normal vector information of the reconstructed frames based on their corresponding features, which serve as the predicted values; predicting the depth and normal vector information of the original frames, which serve as the ground truth values; calculating the difference between the predicted values and the ground truth values as the geometric information loss function.

As an example, for obtaining the network model parameters based on the reconstructed frames and the original frames, the extraction of long-term temporal features can involve the following steps: extracting the feature information from the current reconstructed frame and the previously reconstructed frames, and employing an optimization mechanism based on Gaussian distribution prior to calculate the long-term temporal loss function.

As an example, for obtaining the network model parameters based on the reconstructed frames and the original frames, the calculation of the short-term temporal loss function can involve the following steps: predicting the forward optical flow and backward optical flow information for the reconstructed frames; calculating the ground truth values of the forward optical flow and backward optical flow information between adjacent original frames; and computing the difference between the ground truth optical flow information and the predicted optical flow information as the short-term temporal loss function.

In some embodiments, the iteration optimization of the network model parameters based on the original video sequence can further include: obtaining the rate-distortion of the network model parameters; performing scene division on the original video sequence based on the rate-distortion; obtaining segmented original video sequences; iteratively optimizing the network model parameters based on the segmented original video sequences until the predetermined criteria are met.

Due to the performance loss associated with using a single network to model the entire video sequence, the present embodiment employs a rate-distortion-based scene division approach. By applying the scene division method, the video is divided into multiple video segments. The proposed neural network modeling approach is then applied to model these video segments, obtaining the rate-distortion performance under the current segmentation scheme. Based on the rate-distortion performance, further improvements are made to the segmentation scheme until optimal performance is achieved.

In some embodiments, as illustrated in FIG. 3, novel mechanisms are proposed to fully utilize the feature information provided by the original video sequence. This includes a new spatial position embedding mechanism within video frames and short-term and long-term feature learning mechanisms between frames. These mechanisms further enhance the representational capacity of the neural network model and improve the rate-distortion performance of video encoding.

As an example, initially, a video sequence is modeled and represented using an implicit neural network model based on the video implicit representation method. Subsequently, the network parameters are quantized. In order to further enhance the modeling and representation capacity of the implicit representation neural network, the feature information from the original video sequence utilized in this embodiment mainly includes: the intra-frame spatial information of the video sequence, the inter-frame temporal information of the video sequence, and the scene variation information of the video sequence.

To fully leverage the intra-frame spatial information of the video sequence, this embodiment utilizes contextually relevant spatial position embedding mechanism, frequency domain supervision mechanism, and geometric information supervision mechanism.

The context-related spatial positional embedding method specifically contains:

For the original video frame $v_t$, the invention uses a convolution operation to transform it into a spatial embedding feature $F_e$. For example, The convolution operation with a kernel size of 1×1 and a stride of 1 can be employed:

$$F_e = \psi(v_t).$$

In this invention, this context-related feature $F_e$ will be used together with implicit neural network to reconstruct the frame $\hat{v}_t$.

The frequency domain supervision method specifically contains:

An additional frequency domain loss is added when supervising the reconstructed frame $\hat{v}_t$ to further capture high frequency detail information. Specifically, the invention can uses a fast Fourier transform (FFT) or discrete cosine transform (DCT) operation to transform $\hat{v}_t$ and $v_t$ into frequency domain space, and then calculates the difference between them, which is the loss function.

The geometric information supervision method specifically contains:

In this embodiment, to obtain the geometric information for the current reconstructed frame $\hat{v}_t$, an additional geometric information prediction head $\Psi$ is designed based on the corresponding feature $\hat{Z}_t$. This head is to predict the depth information $\hat{v}_t^d$ and normal vector information $\hat{v}_t^n$ for the current reconstructed frame. This prediction head $\Psi$ is implemented as a convolutional operation with a kernel size of 3×3 and a stride of 1. Then, this embodiment predicts the depth information $v_t^d$ and normal vector information $v_t^n$ for the current frame $v_t$, which are considered as ground truth or true values. Subsequently, the difference between the predicted values and the true values is calculated, serving as the loss function.

To fully leverage the temporal information between frames in the video sequence, this embodiment introduces two mechanisms: the optical flow constraint mechanism for exploiting short-term temporal information and the temporal contrastive learning mechanism for utilizing long-term temporal information.

The optical flow constraint mechanism specifically contains:

a. In order to capture the short-term temporal information between the current reconstructed frame and its adjacent frames, for the feature $\hat{Z}_t$, corresponding to the current reconstructed frame $\hat{v}_t$, this invention designs an additional optical flow information prediction head $\phi$ so as to predict the forward optical flow information $O_t^f$ and the backward optical flow information $O_t^b$. This flow information prediction head $\phi$ is implemented as a convolutional operation with a kernel size of 3×3 and a stride of 1. The forward optical flow information represents the optical flow information from frame t−1 to frame t and the backward optical flow information represents the optical flow information from frame t to frame t−1. Further, in order to supervise the predicted optical flow information $\{O_t^f, O_t^b\}$, this invention performs optical flow prediction algorithm on original frames $\{v_{t-1}, v_t\}$, generating the ground truth $\{O_t^{fgt}, O_t^{bgt}\}$ of predicted the forward optical flow information and the backward optical flow information. Finally, the difference between the ground truth optical flow information and the predicted optical flow information is computed as the loss function.

Temporal contrastive learning mechanism specifically contains:

For the current reconstruction frame $\hat{v}_t$ and the set of previous reconstruction frames $\hat{V}_t^P(\hat{V}_t^P=\{\hat{v}_{t-1}, \hat{v}_{t-2}, \cdots \hat{v}_{t-80}\})$, this invention designs temporal contrastive for long-term temporal correlation capturing. Specifically, this invention first uses the model, such as ResNet-34 (ResNet-34 is a deep residual learning network model used for image recognition, Deep Residual Learning for Image Recognition) to extract the feature of $\hat{v}_t$ and $\hat{V}_t^P$, written as $h_t$ and $H_t^P$.

Then, this invention proposes an optimization mechanism based on a Gaussian distribution prior. For any two features u, v, their cosine similarity is defined as sim(u, v)=$u^T v/\|u\|\|v\|$. Gaussian equation is defined as $$Gau(x) = \frac{1}{\sigma\sqrt{2\pi}}\exp\left(-\frac{x^2}{2\sigma^2}\right),$$

where $\sigma^2$ means the variance in this invention. Therefore, for the t-th frame, the loss function is defined as:

$$\mathcal{L}_{cont} = -\sum_{j=t-L}^{t-1} w_{tj} \log \frac{\exp\left(\frac{sim(h_t, h_j)}{\tau}\right)}{\sum_{k=t-L}^{t-1}\exp\left(\frac{sim(h_t, h_k)}{\tau}\right)},$$

$$w_{tj} = \frac{Gau(t-j)}{\sum_{k=t-L}^{t-1} Gau(t-k)},$$

where j is the frame index, $\tau$ is the temperature factor.

Figures 4, 5:
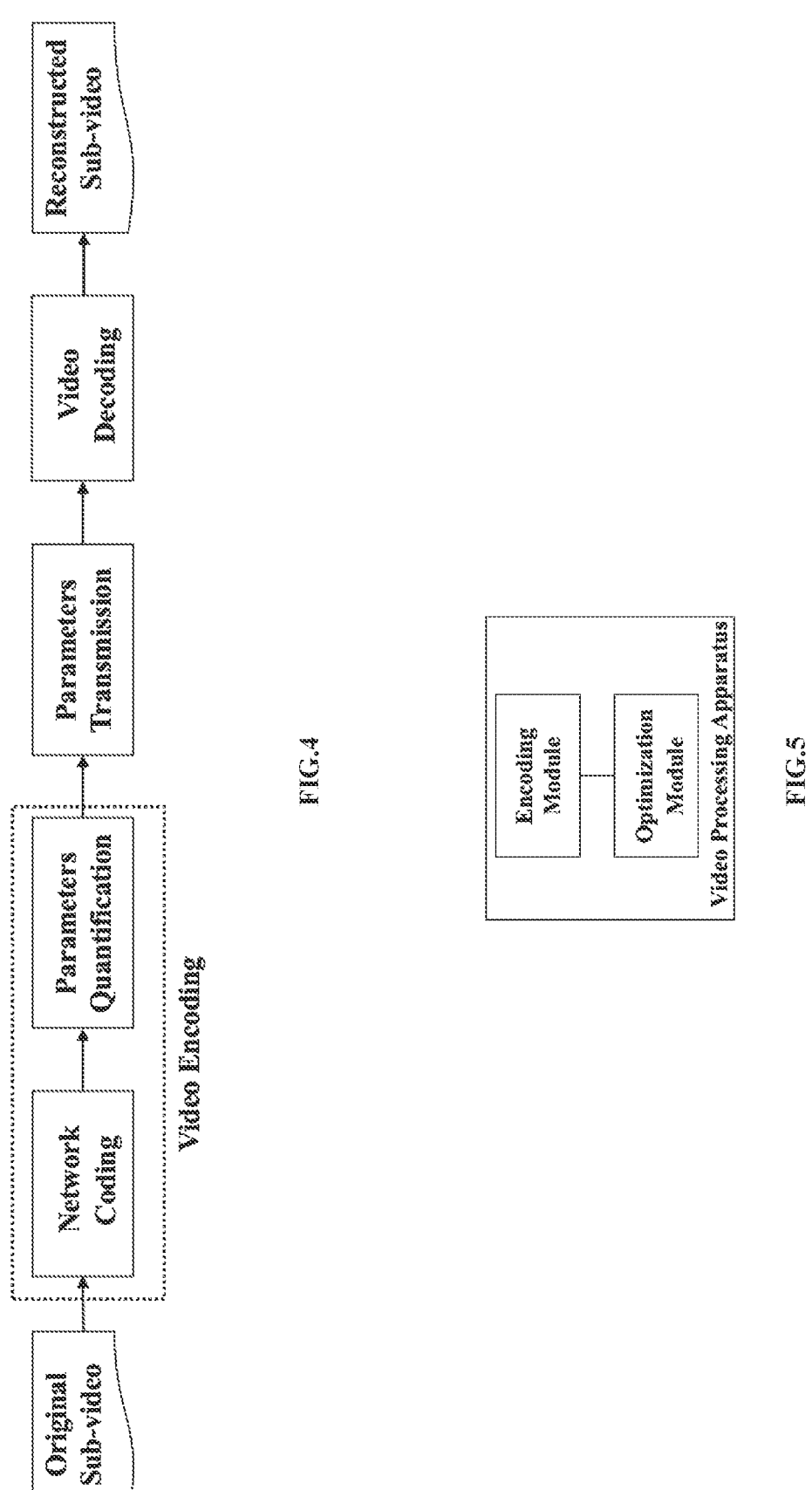
FIG. 4 depicts the flowchart of the video processing method according to one or more embodiments of the present application.
FIG. 5 illustrates the diagram of a video processing apparatus according to one or more embodiments.

In a specific example, as illustrated in FIG. 4, a video processing method can include the following steps:

S101, Scene Division.

First, for a given original video sequence, differentiating based on the changes in scene transitions, the PySceneDetect library function is employed to perform scene division, dividing it into individual sub-video sequences.

S102, Neural network Coding.

1, For a given sub-video sequence obtained from the segmentation, assuming it consists of 80 frames, written as $V=\{v_t, v_{t+1}, \ldots v_{t+80}\}$. Then, the video is encoded into neural network parameters using the proposed encoding method in this application. The specific steps of the encoding process can include any of the steps described in the video processing methods of the aforementioned embodiments.

2, During the neural network encoding stage, the loss function is computed, and the neural network parameters are iteratively trained. In this embodiment, a mini-batch stochastic gradient descent (SGD) optimization algorithm is used for neural network training with a batch size of 1, momentum of 0.9, and weight decay of 1e-5. The learning rate is set to 5e-4, and the maximum number of epochs is set to 900.

S103, The rate-distortion calculation.

In order to achieve the best rate-distortion performance, different scene partitioning methods are compared based on the corresponding sets of neural network parameters and their associated rate-distortion values. By evaluating and comparing the rate-distortion performance of each partitioning method, the most optimal scene partitioning approach can be determined.

S104, Quantization and Decoding Stage

As shown in FIG. 4, in this implementation, a video is initially encoded into a set of neural network parameters using the three aforementioned steps. Subsequently, these network parameters undergo a quantization process to further optimize storage space. Finally, the quantized network parameters are transmitted to the decoding side, where they are used to decode and reconstruct the video sequence. It should be noted that the network architecture of the decoding network is identical to that of the encoding network. However, the network parameters of the decoding network are quantized versions of the parameters of the encoding network.

The proposed method is tested on the AVS video surveillance dataset and the UVG natural scene dataset, compared to the default configuration of VTM12.0. The surveillance sequences included Outdoor_Crowd (Crowd), Bulong_Day-_traffic (Bulong), and Night_Traffic (Night). The natural scene sequences included Bosphorus, HoneyBee, and Shak-eNDry. As shown in Table 1, the proposed method achieved a BDBR (Bitrate-Distortion-Bandwidth Ratio) saving of 21.98% and 13.45% on the surveillance and natural scene sequences, respectively, compared to VTM12.0. The performance of the proposed method, as measured by BDBR (%), significantly outperformed VTM12.0, further demonstrating the superiority of the proposed approach.

BDBR represents the percentage of bitrate that can be saved by a more efficient encoding method at the same objective quality. A lower BDBR indicates better compression performance of the current encoder, meaning that it achieves higher compression efficiency while maintaining the same visual quality.

The video processing approach proposed in this application embodiment goes beyond the conventional use of a limited number of frames to reduce video redundancy. Instead, it leverages the powerful representation capacity of neural networks to discover a continuous and compact representation space for the original video sequence. Specifically, this method encodes the original video sequence into the parameters of a neural network, which enhances decoding speed and performance. Furthermore, the method incorporates a neural network parameter quantization mechanism to optimize storage space and transmission bandwidth. By fully exploring the frame-level spatial features, inter-frame temporal features, and scene variation characteristics of the video sequence, the representation capacity of the neural network is further improved.

Referring to FIG. 5, one embodiment of the present application provides a video processing apparatus comprising:

An encoding module for encoding the original video sequence into network model parameters of the implicit neural network model;

An optimization module for iteratively optimizing the network model parameters based on the original video sequence until a predefined criterion is met.

In some embodiments, the optimization module performs iterative optimization of the network model parameters based on the original video sequence. This includes: Obtaining a loss function for the network model parameters based on the original video sequence: Iteratively optimizing the network model parameters based on the loss function.

In some embodiments, the optimization module calculates the frequency domain loss function for the network model parameters based on the reconstructed frames and the original frames. This includes the following steps: Applying frequency domain transformation operations to both the reconstructed frames and the original frames during the supervision of the reconstructed frames; Computing the difference between the frequency domain representations of the reconstructed frames and the original frames as the frequency domain loss function.

In some embodiments, the optimization module calculates the geometric information loss function for the network model parameters based on the reconstructed frames and the original frames. This includes the following steps: Predicting the depth information and normal vector information of

TABLE 1

| | The results achieved by the method proposed in this embodiment on the surveillance and natural scene sequences are as follows. | | | | | | | |
|---|---|---|---|---|---|---|---|---|
| | Surveillance dataset | | | | Natural dataset | | | |
| Method | Crowd | Bulong | Night | Mean | Bosphorus | HoneyBee | ShakeNDry | Mean |
| Our Method | −30.29% | −14.21% | −21.43% | −21.98% | −3.79% | −28.03% | −8.53% | −13.45% | the reconstructed frames based on their corresponding features, which serves as the predicted values, Predicting the depth information and normal vector information of the original frames, which serves as the ground truth values; Computing the difference between the predicted values and the ground truth values as the geometric information loss function.

In some embodiments, the optimization module calculates the long-term temporal features of the network model parameters based on the reconstructed frames and the original frames. This includes the following steps: Extracting the feature information from the current reconstructed frame and previous reconstructed frames; Utilizing an optimization mechanism based on a Gaussian distribution prior to obtain the long-term temporal loss function.

In some embodiments, the optimization module calculates the short-term temporal loss function of the network model parameters based on the reconstructed frames and the original frames. This includes the following steps: For the features corresponding to the reconstructed frames, predicting the forward optical flow and the backward optical flow; Computing the ground truth forward optical flow and backward optical flow between adjacent original frames; Calculating the difference between the ground truth optical flow and the predicted optical flow as the short-term temporal loss function.

In some embodiments, the optimization module further includes the following steps for iteratively optimizing the network model parameters based on the original video sequence: Calculating the rate-distortion of the network model parameters; Partitioning the original video sequence into scenes based on the rate-distortion; Iteratively optimizing the network model parameters using the partitioned original video sequence until the predefined requirements are met.

In some embodiments, the video processing apparatus further includes a partitioning module, which is responsible for segmenting the input video into multiple original video sequences based on the differences in scene transitions before encoding the original video sequence into the network model parameters of the hidden representation neural network model.

The video processing apparatus provided in this application encodes the original video sequence into network model parameters of the implicit neural network model. It iteratively optimizes the network model parameters based on the original video sequence until a predetermined requirement is met. This approach improves rate-distortion performance, optimizes storage space and transmission bandwidth, overcomes the limitations of existing methods that can only utilize neighboring frames or limited frame information to remove inter-frame redundancy, breaks through the bottleneck of existing video compression algorithms, enhances video compression effectiveness, and reduces the bitrate.

Another embodiment of the present application provides an electronic device comprising a memory, a processor, and a computer program stored in the memory and executable on the processor. The processor executes the computer program to implement any of the methods described in the aforementioned embodiments.

Figure 6:
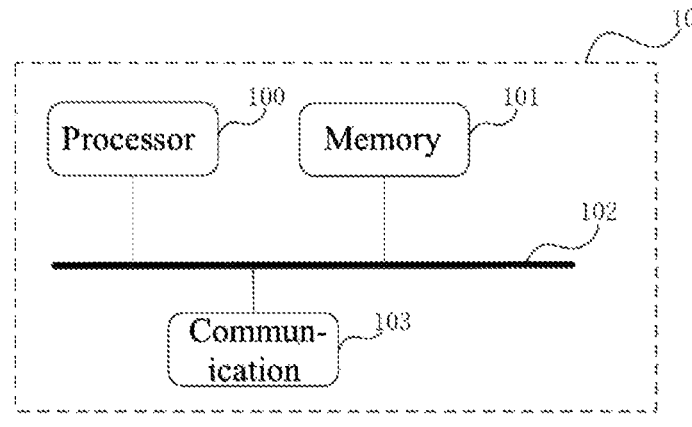
FIG. 6 depicts the diagram of an electronic device structure according to one or more embodiments.

Referring to FIG. 6, the electronic device 10 may include a processor 100, a memory 101, a bus 102, and a communication interface 103. The processor 100, the communication interface 103, and the memory 101 are interconnected via the bus 102. The memory 101 stores a computer program that can be executed on the processor 100. When the processor 100 runs this computer program, it performs the methods provided in any of the aforementioned embodiments of the present application.

The memory 101 may include high-speed random access memory (RAM) and may also include non-volatile memory such as at least one disk storage. The device can establish communication connections with at least one other entity through at least one communication interface 103, which can be wired or wireless. Various communication networks such as the Internet, wide area networks (WANs), local area networks (LANs), metropolitan area networks (MANs), etc., can be utilized for communication between the device and other entities.

The bus 102 can be an ISA bus, PCI bus, EISA bus, or any other suitable bus architecture. The bus can be divided into address bus, data bus, control bus, etc. The memory 101 is used to store programs, and the processor 100 executes the program upon receiving the execution instructions. The methods disclosed in any of the embodiments of the present application can be implemented in the processor 100 or by the processor 100 itself.

The processor 100 can be an integrated circuit chip with signal processing capabilities. In the implementation process, the steps of the above methods can be completed through integrated logic circuits or software instructions in the hardware of the processor 100. The processor 100 can be a general-purpose processor, including a central processing unit (CPU), a network processor (NP), etc. It can also be a digital signal processor (DSP), an application-specific integrated circuit (ASIC), a field-programmable gate array (FPGA), or other programmable logic devices, discrete gates or transistor logic devices, discrete hardware components. The disclosed methods, steps, and logic diagrams in the embodiments of the present application can be implemented or executed by the processor 100. The general-purpose processor can be a microprocessor or any other conventional processor. The combination of the steps of the disclosed methods in the embodiments of the present application can be directly implemented by a hardware decoding processor or a combination of hardware and software modules in the decoding processor. Software modules can be located in random access memory, flash memory, read-only memory, programmable read-only memory, electrically erasable programmable memory, registers, or other mature storage media in the field. The storage medium is located in the memory 101, and the processor 100 reads the information from the memory 101 and combines it with its hardware to perform the steps of the above methods.

The electronic device provided in the embodiments of the present application, as well as the methods disclosed in the embodiments, share the same inventive concept and achieve the same advantageous effects as the methods employed, operated, or implemented by the electronic device.

Figure 7:
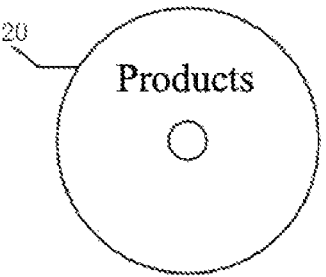
FIG. 7 illustrates a schematic diagram of a computer-readable storage medium according to one or more embodiments.

Another embodiment of the present application provides a computer-readable storage medium that stores a computer program. The computer program is executed by a processor to implement the methods disclosed in any of the embodiments of the present application. As shown in FIG. 7, an example of the computer-readable storage medium is an optical disc 20, which stores the computer program (i.e., program product). When the computer program is executed by a processor, it performs the methods provided in any of the disclosed embodiments.

It should be noted that examples of computer-readable storage media include, but are not limited to, phase-change memory (PRAM), static random-access memory (SRAM), dynamic random-access memory (DRAM), other types of random-access memory (RAM), read-only memory (ROM), electrically erasable programmable read-only memory (EE-PROM), flash memory, or other optical or magnetic storage media, without being limited to these specific examples.

The computer-readable storage medium provided in the embodiments of the present application shares the same inventive concept as the methods disclosed in the embodiments and achieves the same advantageous effects as the methods employed, operated, or implemented by the application programs stored on the storage medium.

It is important to note that:

The term "module" is not intended to be limited to a specific physical form. Depending on the specific application, a module can be implemented as hardware, firmware, software, and/or a combination thereof. Furthermore, different modules can share common components or even be implemented by the same components. The boundaries between different modules may or may not be clearly defined.

The algorithms and displays provided herein are not inherently tied to any specific computer, virtual device, or other equipment. Various generic devices can also be used in conjunction with the examples based on the disclosure provided herein. Based on the description above, the structure required to construct such devices is evident. Additionally, this application is not directed towards any specific programming language. It should be understood that various programming languages can be employed to implement the disclosed content of this application, and the descriptions regarding specific languages are provided to disclose the best mode of the application.

It should be understood that while the steps in the accompanying flowcharts are shown in sequential order as indicated by the arrows, these steps are not necessarily required to be executed in the order specified by the arrows. Unless explicitly stated otherwise in this document, the execution of these steps is not strictly limited to a particular sequence and can be performed in other orders. Moreover, at least some of the steps depicted in the flowcharts can include multiple sub-steps or stages, which may not necessarily be completed at the same time but can be executed at different times. The execution order of these steps, sub-steps, or stages may not necessarily be sequential but can alternate or rotate with at least some parts of other steps or sub-steps of other steps.

The foregoing embodiments merely express the implementation modes of the present application, and their descriptions are more specific and detailed. However, it should not be construed as limiting the scope of the present application. It should be noted that ordinary skilled artisans in the field can make various modifications and improvements within the scope of the present application without departing from the essence of the present application. Therefore, the scope of protection of the present application should be determined by the appended claims.

The invention claimed is:

1. A video processing method, comprising the following steps:

encoding the original video sequence into network model parameters of an implicit neural network model; and iteratively optimizing the network model parameters based on the original video sequence until a predetermined requirement is met;

wherein the iterative optimization of the network model parameters based on the original video sequence further comprises:

obtaining the loss function of the network model parameters based on the original video sequence; and iteratively optimizing the network model parameters based on the loss function obtained from the original video sequence;

wherein the obtaining of the loss function of the network model parameters based on the original video sequence further comprises:

transforming the individual frames of the original video sequence into spatially embedded features using convolutional operations;

utilizing the spatially embedded features along with an implicit neural network to reconstruct the frames and obtain reconstructed frames; and obtaining the frequency domain loss function, geometric information loss function, long-term temporal loss function, and short-term temporal loss function of the network model parameters based on the reconstructed frames and the original frames.

2. The video processing method according to claim 1, wherein the obtaining of the frequency domain loss function of the network model parameters based on the reconstructed frames and the original frames further comprises:

during the supervision of the reconstructed frames, perform frequency domain transformation on both the reconstructed frames and the original frames using frequency domain transformation operations; and using the difference between the frequency domain representations of the reconstructed frames and the original frames in the frequency domain space as the frequency domain loss function.

3. The video processing method according to claim 1, wherein the obtaining of the geometric information loss function of the network model parameters based on the reconstructed frames and the original frames further comprises:

predicting the depth information and normal vector information of the reconstructed frames by performing prediction on the corresponding features of the reconstructed frames, These predicted values serve as the estimated depth information and normal vector information for the reconstructed frames;

predicting the depth information and normal vector information of the original frames, which serve as the ground truth values for the depth and normal vector information; and calculating the difference between the predicted values and the ground truth values of the depth and normal vector information, wherein the difference serves as the geometric information loss function.

4. The video processing method according to claim 1, wherein the obtaining of the long-term temporal features of the network model parameters based on the reconstructed frames and the original frames further comprises:

extracting the feature information from the current reconstructed frame and previous reconstructed frames; and utilizing an optimization mechanism based on Gaussian distribution prior to obtain the long-term temporal loss function.

5. The video processing method according to claim 1, wherein the obtaining of the short-term temporal loss function of the network model parameters based on the reconstructed frames and the original frames further comprises:

for the features corresponding to the reconstructed frames, predicting the forward optical flow information and the backward optical flow information;

calculating the ground truth forward optical flow and backward optical flow between two adjacent original frames; and calculating the difference between the ground truth optical flow and the predicted optical flow as the short-term temporal loss function.

6. The video processing method according to claim 1, the iteratively optimizing of the network model parameters based on the original video sequence further comprises:

obtaining the rate-distortion of the network model parameters;

according to the rate-distortion, performing scene division on the original video sequence to obtain the segmented original video sequence; and iteratively optimizing the network model parameters based on the segmented original video sequence until the preset requirements are met.

7. The video processing method according to claim 1, prior to the encoding of the original video sequence into the implicit neural network model parameters, the method further comprises:

based on the differences in scene transitions, performing scene division on the input video to obtain multiple original video sequences.

8. A video processing device, comprising:

an encoding module, for encoding the original video sequence into network model parameters of the implicit neural network model; and an optimization module, for iteratively optimizing the network model parameters based on the original video sequence until a predefined criterion is met;

wherein the iterative optimization of the network model parameters based on the original video sequence further comprises:

obtaining the loss function of the network model parameters based on the original video sequence; and iteratively optimizing the network model parameters based on the loss function obtained from the original video sequence;

wherein the obtaining of the loss function of the network model parameters based on the original video sequence further comprises:

transforming the individual frames of the original video sequence into spatially embedded features using convolutional operations;

utilizing the spatially embedded features along with an implicit neural network to reconstruct the frames and obtain reconstructed frames; and obtaining the frequency domain loss function, geometric information loss function, long-term temporal loss function, and short-term temporal loss function of the network model parameters based on the reconstructed frames and the original frames.

9. An electronic device comprising a memory, a processor, and a computer program stored in the memory and executable on the processor, wherein the processor executes the computer program to implement the video processing method according to claim 1.

10. The video processing method according to claim 2, the iteratively optimizing of the network model parameters based on the original video sequence further comprises:

obtaining the rate-distortion of the network model parameters;

according to the rate-distortion, performing scene division on the original video sequence to obtain the segmented original video sequence; and iteratively optimizing the network model parameters based on the segmented original video sequence until the preset requirements are met.

11. The video processing method according to claim 3, the iteratively optimizing of the network model parameters based on the original video sequence further comprises:

obtaining the rate-distortion of the network model parameters;

according to the rate-distortion, performing scene division on the original video sequence to obtain the segmented original video sequence; and iteratively optimizing the network model parameters based on the segmented original video sequence until the preset requirements are met.

12. The video processing method according to claim 4, the iteratively optimizing of the network model parameters based on the original video sequence further comprises:

obtaining the rate-distortion of the network model parameters;

according to the rate-distortion, performing scene division on the original video sequence to obtain the segmented original video sequence; and iteratively optimizing the network model parameters based on the segmented original video sequence until the preset requirements are met.

13. The video processing method according to claim 5, the iteratively optimizing of the network model parameters based on the original video sequence further comprises:

obtaining the rate-distortion of the network model parameters;

according to the rate-distortion, performing scene division on the original video sequence to obtain the segmented original video sequence; and iteratively optimizing the network model parameters based on the segmented original video sequence until the preset requirements are met.

14. The video processing method according to claim 2, prior to the encoding of the original video sequence into the implicit neural network model parameters, the method further comprises:

based on the differences in scene transitions, performing scene division on the input video to obtain multiple original video sequences.

* * * * *